US012737337B2

(12) United States Patent
Jung et al.

(10) Patent No.: US 12,737,337 B2
(45) Date of Patent: Sep. 15, 2026

(54) METHOD AND SYSTEM FOR IDENTIFYING GRID FORMAT OBJECT IN ROBOTIC PROCESS AUTOMATION ENVIRONMENT

(71) Applicant: SAMSUNG SDS CO., LTD., Seoul (KR)

(72) Inventors: Hwang Young Jung, Seoul (KR); Hyo Young Kim, Seoul (KR); Jae Cheol Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 18/927,109

(22) Filed: Oct. 25, 2024

(65) Prior Publication Data

US 2025/0173320 A1 May 29, 2025

(30) Foreign Application Priority Data

Nov. 28, 2023 (KR) ........................ 10-2023-0167829
Feb. 8, 2024 (KR) ........................ 10-2024-0019863

(51) Int. Cl.
*G06F 16/22* (2019.01)
*G06F 16/25* (2019.01)

(52) U.S. Cl.
CPC ...... *G06F 16/2246* (2019.01); *G06F 16/2291* (2019.01); *G06F 16/25* (2019.01)

(58) Field of Classification Search
CPC .. G06F 16/2246; G06F 16/2291; G06F 16/23; G06F 16/25; G06F 16/254; G06F 16/26; G06F 16/284; G06F 16/289
See application file for complete search history.

(56) References Cited

U.S. PATENT DOCUMENTS 10,878,195 B2 * 12/2020 Duta .................... G06V 30/153
11,301,268 B2 4/2022 Dines
2007/0133842 A1 * 6/2007 Harrington .......... G06V 30/414 382/112
2014/0032594 A1 * 1/2014 Bayliss ................ G06F 16/951 707/769

(Continued)

FOREIGN PATENT DOCUMENTS

CN 113836878 A 12/2021
CN 111259854 B 4/2023

(Continued)

*Primary Examiner* — James E Richardson
(74) *Attorney, Agent, or Firm* — Sughrue Mion, PLLC

(57) ABSTRACT

A method for identifying a grid-format object in a robotic process automation (RPA) environment, the method being performed by a computing device, is provided. The method may comprise receiving a search reference object, searching for an ancestor object of the search reference object on a hierarchical structure tree and determining the searched ancestor object as a first row candidate object, determining a sibling object of the first row candidate object on the hierarchical structure tree as a second row candidate object, determining whether a child object of the first row candidate object and a child object of the second row candidate object satisfy a column relationship with each other on the hierarchical structure tree and identifying each of the first row candidate object and the second row candidate object as a grid-format object, based on the determination result.

17 Claims, 12 Drawing Sheets

(56) References Cited

U.S. PATENT DOCUMENTS

| | | | | |
|---|---|---|---|---|
| 2016/0335303 | A1* | 11/2016 | Madhalam | G06F 16/2455 |
| 2023/0102809 | A1* | 3/2023 | Vanderzee | G06F 8/10 718/100 |
| 2023/0419705 | A1* | 12/2023 | Truscott | G06F 9/453 |

FOREIGN PATENT DOCUMENTS

| | | | | | |
|---|---|---|---|---|---|
| CN | 116052193 | B | | 6/2023 | |
| CN | 116501310 | A | | 7/2023 | |
| CN | 116978042 | A | * | 10/2023 | G06V 30/412 |
| CN | 120388387 | A | * | 7/2025 | |
| KR | 10-2023-0165086 | A | | 12/2023 | |
| KR | 102826571 | B1 | * | 6/2025 | G06V 30/422 |

* cited by examiner

| Name | Employee number | Department | Qualification | Education subject status |
|---|---|---|---|---|
| (0,0) HongOO | (0,1) 12345 | (0,2) Marketing | (0,3) O | (0,4) X |
| (1,0) KimOO | (1,1) 13637 | (1,2) Development | (1,3) X | (1,4) O |
| (2,0) JungOO | (2,1) 36129 | (2,2) Human Resources | (2,3) O | (2,4) X |
| (3,0) ParkOO | (3,1) 78931 | (3,2) Sales | (3,3) X | (3,4) O |

(Row number, Column number)

40

| Hierarchical structure |
| --- |
| Group (grid-format object)<br>└ Group1 (Row)<br>└ Group1 (Column)<br>└ Information<br>└ Group2 (Column)<br>└ Information<br>└ Group2 (Row)<br>└ Group1 (Column)<br>└ Group2 (Column)<br>└ Group3 (Row)<br>└ Group1 (Column)<br>└ Group2 (Column)<br>└ Group4 (Row)<br>└ Group1 (Column)<br>└ Group2 (Column) |

41

| Automation characteristic name | Automation characteristic value |
| --- | --- |
| UI object name (Name) | MP3 purchase |
| Object type (ControlType) | DataItem |
| Position, size (BoundingRectangle) | l:-823 t:465 r:-720 b:531 |
| UI class name (ClassName) | UIA_DataItemControl |
| UI framework (FrameworkId) | Chrome |
| ... | ... |

FIG. 4

| Column candidate group comparison matching | | | | |
|---|---|---|---|---|
| Matching number | Column comparison object 1 | Column comparison object 1 | Matching | Remarks |
| 1 | KimOO | KimOO | O | No distinctions |
| 2 | 13637 | 36129 | O | No distinctions |
| - | | Additional information | X | Column comparison object 1 does not have an object with a layout comparable to the "additional information" present in column comparison object 2 |
| 3 | Development | Human Resources | O | No distinctions |
| 4 | ! ? | O | O | Area sizes of column comparison object 1 and column comparison object 2 are different from each other, but a right position among the left/right/ middle positions thereof match each other. Thus, column comparison object 1 and column comparison object 2 may be compared with each other |
| 5 | O | X | O | No distinctions |

FIG. 12

METHOD AND SYSTEM FOR IDENTIFYING GRID FORMAT OBJECT IN ROBOTIC PROCESS AUTOMATION ENVIRONMENT

CROSS-REFERENCE TO RELATED APPLICATION(S)

This application claims priority from Korean Patent Application Nos. 10-2023-0167829 filed on Nov. 28, 2023 and 10-2024-0019863 filed on Feb. 8, 2024 in the Korean Intellectual Property Office, and all the benefits accruing therefrom under 35 U.S.C. 119, the contents of which in its entirety are herein in company by reference.

BACKGROUND

Field

The present disclosure relates to a method and system for identifying a grid-format object in an RPA (Robotic Process Automation) environment. More specifically, the present disclosure relates to a method and system for identifying a grid-format object in an RPA (Robotic Process Automation) environment in which when a certain work program is developed to display grid-format information in a scheme other than a standard UI control scheme, a RPA solution may recognize the grid-format information as a grid-format object and perform repetition and traversing thereon.

Description of Related Art

RPA technology is a software technology that enables easy building, implementation, and management of a software robot that emulates interactions between a digital system and a software and a person.

RPA work automation is most efficient when information being processed have a similar structure. In this regard, the structure is usually expressed in a grid-type UI format such as a table or list in software programs.

When the program implements and displays the grid-type UI format using a standard UI control, the operating system provides automation characteristic information about a grid-format structure supported by the standard UI control so that work automation by the RPA solution may be achieved. However, when the program is developed to display the grid-format information in a scheme other than the above standard UI control scheme, the operating system cannot provide grid-format structure information, thereby causing a problem in that work automation on information with a similar structure cannot be realized.

Therefore, a scheme is required in which even when an object is visually expressed in a grid-format structure on UI, but the implemented UI control does not provide automation characteristic information of the object of the grid-format structure, the RPA solution identifies the object as an object of the grid-format structure and automates work thereon.

SUMMARY

A technical purpose to be achieved in accordance with some embodiments of the present disclosure is to provide a method and system for identifying a grid-format object in an RPA environment in which even when an implemented UI control does not provide automation characteristic information of a grid-format object, an RPA solution identifies the object as an object of a grid-format structure.

Another technical purpose to be achieved in accordance with some embodiments of the present disclosure is to provide a method and system for identifying a grid-format object in an RPA environment in which an RPA solution identifies an object on UI as an object of a grid-format structure using logical hierarchical structure information implemented in a program.

The technical purposes of the present disclosure are not limited to the technical purposes as mentioned above, and other technical purposes as not mentioned may be clearly understood by those skilled in the art from descriptions as set forth below.

According to an aspect of the present closure, there is provided a method for identifying a grid-format object in an RPA (Robotic Process Automation) environment, the method being performed by a computing device. The method may comprise receiving a search reference object; searching for an ancestor object of the search reference object on a hierarchical structure tree and determining the searched ancestor object as a first row candidate object; determining a sibling object of the first row candidate object on the hierarchical structure tree as a second row candidate object; determining whether a child object of the first row candidate object and a child object of the second row candidate object satisfy a column relationship with each other on the hierarchical structure tree; and identifying each of the first row candidate object and the second row candidate object as a grid-format object, based on the determination result.

In some embodiments, the receiving of the search reference object may include receiving a UI (user interface) object designated by a user.

In some embodiments, the determining of the searched ancestor object as the first row candidate object may include determining whether an application of the search reference object and an application of a parent object of the search reference object are identical with each other; and upon determination that the application of the search reference object and the application of the parent object of the search reference object are identical with each other, determining the search reference object as the first row candidate object, wherein the determining of the sibling object of the first row candidate object as the second row candidate object includes: determining whether automation characteristic information of the sibling object of the first row candidate object and automation characteristic information of the first row candidate object are identical with each other; and comparing a structure of a first sibling object having the automation characteristic information identical with the automation characteristic information of the first row candidate object with a structure of the first row candidate object.

In some embodiments, the determining of whether the automation characteristic information of the sibling object of the first row candidate object and the automation characteristic information of the first row candidate object are identical with each other includes: upon determination that there is no sibling object having the automation characteristic information identical with the automation characteristic information of the first row candidate object, determining a parent object of the first row candidate object as the first row candidate object.

In some embodiments, the comparing of the structure of the first sibling object having the automation characteristic information identical with the automation characteristic information of the first row candidate object with the structure of the first row candidate object includes: determining whether a horizontal start position of the first sibling object and a horizontal start position of the first row candidate object are identical with each other; determining whether a vertical height of the first sibling object and a vertical height of the first row candidate object are equal to each other; and determining whether a position of the first sibling object and a position of the first row candidate object are consecutive.

In some embodiments, the determining of whether the horizontal start position of the first sibling object and the horizontal start position of the first row candidate object are identical with each other includes: upon determination that the horizontal start position of the first sibling object and the horizontal start position of the first row candidate object are not identical with each other, determining a parent object of the first row candidate object as the first row candidate object.

In some embodiments, the determining of whether the vertical height of the first sibling object and the vertical height of the first row candidate object are equal to each other includes: upon determination that the vertical height of the first sibling object and the vertical height of the first row candidate object are not equal to each other, determining a parent object of the first row candidate object as the first row candidate object.

In some embodiments, the determining of whether the position of the first sibling object and the position of the first row candidate object are consecutive includes: upon determination that the position of the first sibling object and the position of the first row candidate object are not consecutive, determining a parent object of the first row candidate object as the first row candidate object.

In some embodiments, the determining of whether the child object of the first row candidate object and the child object of the second row candidate object satisfy the column relationship with each other includes: selecting a second object to be compared with a first object, wherein the first object is the child object of the first row candidate object, wherein the second object is the child object of the second row candidate object; comparing automation characteristic information of the first object and automation characteristic information of the second object with each other; comparing a structure of the first object and a structure of the second object with each other, based on the comparing result between the automation characteristic information of the first and second objects; and generating a column element list of a row constituting the grid-format object, based on the comparing result between the structures of the first and second structures.

In some embodiments, the selecting of the second object to be compared with the first object includes: obtaining a first sorting reference position as a sorting criterion of the first object; and selecting an object having a sorting reference position identical with the first sorting reference position as the second object, wherein the sorting criterion includes at least one of left sorting, right sorting, and center sorting.

In some embodiments, the comparing of the structure of the first object and the structure of the second object with each other includes: upon determination that the automation characteristic information of the first object and the automation characteristic information of the second object are identical with each other, adding the first object to the column element list.

In some embodiments, the comparing of the structure of the first object and the structure of the second object with each other includes: upon determination that the automation characteristic information of the first object and the automation characteristic information of the second object are not identical with each other, comparing a horizontal width of the first object with a horizontal width of the second object; and upon determination that the horizontal width of the first object and the horizontal width of the second object are equal to each other, adding the first object to the column element list.

In some embodiments, the comparing of the structure of the first object and the structure of the second object with each other includes: upon determination that the automation characteristic information of the first object and the automation characteristic information of the second object are not identical with each other, comparing a horizontal width of the first object with a horizontal width of the second object; and upon determination that the horizontal width of the first object and the horizontal width of the second object are not equal to each other, determining a parent object of the search reference object as the first row candidate object.

In some embodiments, the identifying of each of the first row candidate object and the second row candidate object as the grid-format object, based on the determination result includes: comparing automation characteristic information of a third row candidate object as a sibling object of the determined first row candidate object with automation characteristic information of the first row candidate object; determining whether a child object of the first row candidate object and a child object of the third row candidate object satisfy a column relationship with each other; and upon determination the automation characteristic information of the third row candidate object and the automation characteristic information of the first row candidate object are identical with each other, and the child object of the first row candidate object and the child object of the third row candidate object satisfy the column relationship with each other, identifying the third row candidate object as the grid-format object.

According to another aspect of the present closure, there is provided a system for identifying a grid-format object in an RPA environment. The system may comprise a communication interface; a memory configured to load thereon a computer program; and at least one processor configured to execute the computer program, wherein the computer program includes instructions for performing: an operation of receiving a search reference object; an operation of searching for an ancestor object of the search reference object on a hierarchical structure tree and determining the searched ancestor object as a first row candidate object; an operation of determining a sibling object of the first row candidate object on the hierarchical structure tree as a second row candidate object; an operation of determining whether a child object of the first row candidate object and a child object of the second row candidate object satisfy a column relationship with each other on the hierarchical structure tree; and an operation of identifying each of the first row candidate object and the second row candidate object as a grid-format object, based on the determination result.

In some embodiments, the operation of determining the searched ancestor object as the first row candidate object includes: an operation of determining whether an application of the search reference object and an application of a parent object of the search reference object are identical with each other; and an operation of determining the search reference object as the first row candidate object, upon determination that the application of the search reference object and the application of the parent object of the search reference object are identical with each other, wherein the operation of determining the sibling object of the first row candidate object as the second row candidate object includes: an operation of determining whether automation characteristic information of the sibling object of the first row candidate object and automation characteristic information of the first row candidate object are identical with each other; and an operation of comparing a structure of a first sibling object having the automation characteristic information identical with the automation characteristic information of the first row candidate object with a structure of the first row candidate object.

In some embodiments, the operation of determining of whether the child object of the first row candidate object and the child object of the second row candidate object satisfy the column relationship with each other includes: an operation of selecting a second object to be compared with a first object, wherein the first object is the child object of the first row candidate object, wherein the second object is the child object of the second row candidate object; an operation of comparing automation characteristic information of the first object and automation characteristic information of the second object with each other; an operation of comparing a structure of the first object and a structure of the second object with each other, based on the comparing result between the automation characteristic information of the first and second objects; and an operation of generating a column element list of a row constituting the grid-format object, based on the comparing result between the structures of the first and second structures.

In some embodiments, the operation of identifying of each of the first row candidate object and the second row candidate object as the grid-format object, based on the determination result includes: an operation of comparing automation characteristic information of a third row candidate object as a sibling object of the determined first row candidate object with automation characteristic information of the first row candidate object; an operation of determining whether a child object of the first row candidate object and a child object of the third row candidate object satisfy a column relationship with each other; and an operation of identifying the third row candidate object as the grid-format object, upon determination the automation characteristic information of the third row candidate object and the automation characteristic information of the first row candidate object are identical with each other, and the child object of the first row candidate object and the child object of the third row candidate object satisfy the column relationship with each other.

According to still another aspect of the present closure, there is provided a computer program stored in a computer-readable recording medium, wherein the computer-readable recording medium is connected to a computer device, wherein when the computer program is executed by a computing device, the computer program causes the computer device to perform: an operation of receiving a search reference object; an operation of searching for an ancestor object of the search reference object on a hierarchical structure tree and determining the searched ancestor object as a first row candidate object; an operation of determining a sibling object of the first row candidate object on the hierarchical structure tree as a second row candidate object; an operation of determining whether a child object of the first row candidate object and a child object of the second row candidate object satisfy a column relationship with each other on the hierarchical structure tree; and an operation of identifying each of the first row candidate object and the second row candidate object as a grid-format object, based on the determination result.

In some embodiments, the operation of identifying of each of the first row candidate object and the second row candidate object as the grid-format object, based on the determination result includes: an operation of comparing automation characteristic information of a third row candidate object as a sibling object of the determined first row candidate object with automation characteristic information of the first row candidate object; an operation of determining whether a child object of the first row candidate object and a child object of the third row candidate object satisfy a column relationship with each other; and an operation of identifying the third row candidate object as the grid-format object, upon determination the automation characteristic information of the third row candidate object and the automation characteristic information of the first row candidate object are identical with each other, and the child object of the first row candidate object and the child object of the third row candidate object satisfy the column relationship with each other.

BRIEF DESCRIPTION OF DRAWINGS

The above and other aspects and features of the present disclosure will become more apparent by describing in detail illustrative embodiments thereof with reference to the attached drawings, in which:

FIG. 4 is an example diagram showing a hierarchical structure tree and automation characteristic information according to another embodiment of the present disclosure;

FIG. 12 is an example diagram for illustrating a result of column information analysis according to still yet another embodiment of the present disclosure;

DETAILED DESCRIPTION

Figures 1, 2:
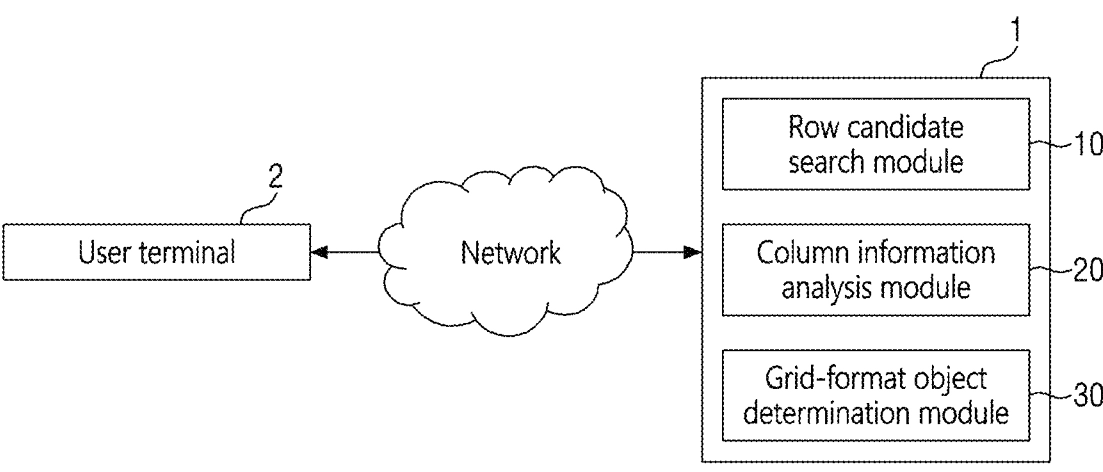
FIG. 1 is an example diagram for illustrating a work automation method on a grid-format object in a conventional RPA environment.
FIG. 2 is a diagram illustrating an environment in which a grid-format object identification system in an RPA environment according to some embodiments of the present disclosure is performed.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

Hereinafter, with reference to FIG. 1, a work automation method on a grid-format object in a conventional RPA environment is described. FIG. 1 is an example diagram for illustrating a work automation method on a grid-format object in a conventional RPA environment.

Conventional RPA solutions rely on automation pattern information provided by an operating system to obtain automation information about a grid-format object. The automation pattern information includes whether the grid-format structure UI is recognized, a total number of rows and columns in the grid-format structure, information about each of rows, and information about each of columns.

For example, referring to FIG. 1, a table format screen is shown that displays the names of employees, employee numbers, departments, qualification acquisition status, and education subject status thereof. When the solution is to create an automation scenario in which the education subject status of each employee is activated or deactivated based on the qualification acquisition status of each employee and an email is sent to each employee having the activated education subject status, the table format screen shown in FIG. 1 should be recognized as a grid-format structure so that the RPA solution may iterate and traverse the same.

However, when a target work program displays the grid-format structure using a non-grid-format UI control, the RPA solution does not recognize the table format screen as the grid-format structure, so that the RPA solution cannot recognize the information about each row and the information about each column as an index number as shown in FIG. 1. When the RPA solution does not recognize the information of each row and each column as an index number, the automated work processing of the RPA solution by traversing items of the grid-format structure is impossible.

Therefore, in order to achieve the problem that the conventional RPA solution is limited in terms of recognizing the grid-format UI object, the present disclosure proposes a method of recognizing the grid-format UI object through the layout and hierarchical structure information by utilizing the fact that the operating system provides a series of automation characteristic information such as the position, size, hierarchical structure information, and control type of the UI object.

In this regard, it is assumed that an object expressed as a grid-format UI structure on the work program screen may be expressed in a form of a logical hierarchical structure tree, and each node in the hierarchical structure tree includes automation characteristic information such as the position, size, and control type of the UI object expressed by the node.

Hereinafter, with reference to FIG. 2, a configuration and operation of a grid-format object identification system in the RPA environment according to some embodiments of the present disclosure will be described. FIG. 2 is a drawing illustrating an environment in which a grid-format object identification system operates in an RPA environment according to some embodiments of the present disclosure.

Referring to FIG. 2, the grid-format object identification system 1 may be configured to include a row candidate search module 10, a column information analysis module 20, and a grid-format object determination module 30. However, the scope of the present disclosure is not limited thereto. In some cases, the grid-format object identification system may be configured to further include modules/device/systems not illustrated in FIG. 2. Alternatively, the grid-format object identification system may be configured in a structure in which at least some of the components 10 to 30 illustrated in FIG. 2 are excluded.

The grid-format object identification system 1 may receive a search reference object from a user terminal 2. The search reference object may mean a UI object designated by a user. That is, the user may input one object included in the grid-format structure through the user terminal 2.

When the search reference object is input from the user, the row candidate search module 10 may determine an object that may be a row candidate while starting from the input search reference object and traversing the logical hierarchical structure tree upwardly. When the row candidate search module 10 has determined a row candidate object that satisfies a predetermined criterion, the column information analysis module 20 may analyze column construction information of each row candidate object and determine whether a column relationship between child objects of the row candidate object is satisfied. However, when the row candidate search module 10 fails to determine the row candidate object that satisfies the predetermined criterion, a parent object of a current search reference object in the hierarchical structure tree may be designated as a search reference object again, and then, the object that may be a row candidate may be determined while traversing the logical hierarchical structure tree upwardly.

The column information analysis module 20 may determine whether the row candidate object determined by the row candidate search module 10 is actually some of rows of a single grid-format object. The column information analysis module 20 may determine whether the child objects of the row candidate object include the same construction information (e.g., object position, size, control type, etc.) and determine whether the row candidate object may be identified as the grid-format object based on the determination result. In this regard, the column information analysis module 20 may generate a list of column elements that may constitute each of rows of the grid-format object.

When all child objects of the row candidate object have the same construction information, the row candidate object may be determined as some of rows of a single grid-format object. However, when the child objects of the row candidate object have different construction information, the grid-format object identification system 1 may designate a parent object of a current search reference object as a search reference object again on the hierarchical structure tree and may determine an object that may be a row candidate while traversing the logical hierarchical structure tree upwards.

The grid-format object determination module 30 may determine whether all other row candidate objects include all the information included in the column element list generated by the column information analysis module 20 on the determined row candidate object, and identify the entire grid-format object based on the determination result.

In some embodiments, the user terminal 2 and the grid-format object identification system 2 may communicate with each other through a network. In this regard, the network may be embodied as any type of wired/wireless networks such as a local area network (LAN), a wide area network (WAN), a mobile radio communication network, Wibro (Wireless Broadband Internet), etc.

Hereinafter, for the convenience of understanding, the description will be made under assumption that all steps/operations of methods to be described later are performed in the grid-format object identification system 10 as described above. Therefore, it may be appreciated that when a subject of a specific step/operation is omitted, the specific step/operation is performed in the grid-format object identification system 10. However, in an actual environment, some of the steps/operations of the methods to be described later may be performed in another computing device.

Hereinafter, with reference to FIG. 3 and subsequent drawings, a method for identifying a grid-format object in an RPA environment according to the present disclosure will be described in detail.

Figure 3:
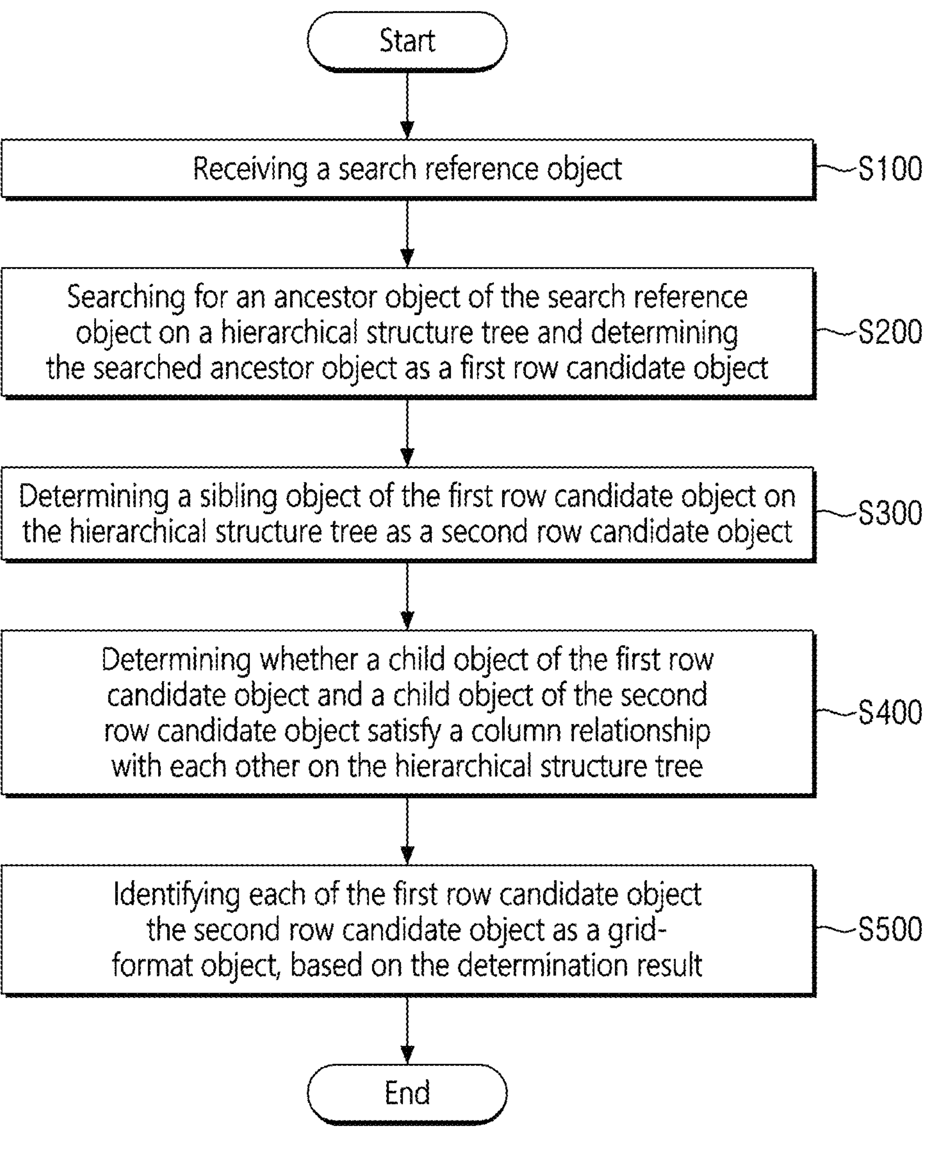
FIG. 3 is a flowchart illustrating a method for identifying a grid-format object in an RPA environment according to one embodiment of the present disclosure.

With reference to FIG. 3, a method for identifying a grid-format object in an RPA environment according to an embodiment of the present disclosure will be described. FIG. 3 is a flowchart showing a method for identifying a grid-format object in an RPA environment according to an embodiment of the present disclosure.

With reference to FIG. 3, the grid-format object identification system 1 may receive a search reference object from the user terminal 2 in S100. The search reference object may mean a UI object specified by the user. That is, the user may input one object included in the grid-format structure illustrated in FIG. 1 through the user terminal 2.

Thereafter, the row candidate search module 10 may search for an ancestor object of the search reference object on the hierarchical structure tree including the search reference object and determine a first row candidate object based on the searching result in S200. Hereinafter, with reference to FIG. 4, the structure of the hierarchical structure tree including the search reference object and the automation characteristic information will be described. FIG. 4 is an example diagram showing the hierarchical structure tree and the automation characteristic information according to another embodiment of the present disclosure.

As described above, the object expressed in the grid-format UI structure on the work program screen may be expressed in the form of the logical hierarchical structure tree, and each node on the hierarchical structure tree includes the automation characteristic information such as the position, size, and control type of the UI object expressed by the node.

Referring to FIG. 4, the hierarchical structure tree 40 and the automation characteristic information 41 of any object on the hierarchical structure tree are illustrated. The hierarchical structure tree 40 may be expressed as a tree in which each row is a child object based on a group, and each column is a child object based on each row. The grid-format object identification system 1 may select a row candidate object that satisfies a predetermined condition while traversing the hierarchical structure tree 40 constructed as described above, and determine whether the child object of the selected row candidate object includes a column element list, and then, finally identify the grid-format object including all rows.

The automation characteristic information 41 may include information such as the name of the UI object, the type of the object, the position and size of the object, the class name of the UI object, and the framework of the UI object. The grid-format object identification system 1 may determine a row candidate object using the automation characteristic information 41 of each object, and generate a column element list that constitutes the row. A detailed description thereof will be provided later and is omitted now.

The object type Control Type indicates the type of the UI control. The object type is determined by the developer of the UI automation provider. The object type may be defined as about 20 types, such as DataItem and ListItem. Since a person skilled to in the technical field to which the present disclosure belongs is already familiar with the knowledge of the object type, a detailed description thereof is omitted herein.

The position and size Bounding Rectangle of the object are expressions that represent a range of a two-dimensional object (e.g., point, line, polygon) within the x-y coordinate system. Referring to the example in FIG. 4, 1 means the coordinate value of the leftmost side of the object, t means the coordinate value of the topmost side of the object, r means the coordinate value of the rightmost side of the object, and b means the coordinate value of the bottommost side of the object.

The UI class name ClassName and the framework FrameworkID of the UI object may be arbitrarily specified by the user.

Each piece of information included in the above automation characteristic information may be used to determine each row candidate object and generate a list of column elements of each of rows that constitute the grid-format object.

Description will be made with reference to FIG. 3.

The row candidate search module 10 may determine a sibling object of a first row candidate object as a second row candidate on the hierarchical structure tree described with reference to FIG. 4 in S300. Information of a general grid-format structure lists each information set in a vertical direction, and horizontal layouts of the rows are similar to each other. Thus, the row candidate search module 10 may determine the sibling object of the first row candidate object as the second row candidate.

The grid-format object identification system 1 may determine the first row candidate object and the second row candidate object, that is, two row candidate objects, and compare the column element lists of the two row candidate objects with each other. The grid-format object identification system 1 determines whether each of the two row candidate objects may be identified as the grid-format object, and at the same time generates the column element list that constitutes the row candidate object, and may ultimately determining whether each of all UI objects displayed on the screen may be identified as the grid-format object.

A method for determining the first row candidate object and the second row candidate object will be described later with reference to FIG. 5 to FIG. 8.

Thereafter, the column information analysis module 20 may determine whether the child object of the first row candidate object and the child object of the second row candidate object satisfy the column relationship with each other in S400. The column information analysis module 20 may determine whether the first row candidate object and the second row candidate object may be some of the rows of the grid-format object. In order to determine whether the first row candidate object and the second row candidate object are rows constituting the grid-format object, the column information analysis module 20 may determine whether the child objects of each row candidate object, that is, columns of each row candidate object, have the same construction information (e.g., object position and size, object type, etc.). In information of the general grid-format structure, the columns represent construction information of the same characteristic. Thus, the column information analysis module 20 may determine whether the child objects of each row candidate object, that is, columns of each row candidate object, have the same construction information (e.g., object position and size, object type, etc.).

A scheme in which the column information analysis module 20 determines whether the child objects of the first row candidate object and the child objects of the second row candidate object satisfy the column relationship with each other is described in detail with reference to FIG. 9 to FIG. 12.

Afterwards, the grid-format object determination module 30 may identify each of the first row candidate object and the second row candidate object as the grid-format object based on the determination result of S400 in S500. The grid-format object determination module 30 may determine whether each of the two row candidate objects may be identified as the grid-format object, and at the same time, may determine whether each of all UI objects displayed on the screen may be identified as the grid-format object using the column element list generated by the column information analysis module 20.

The method for identifying each of the first row candidate object and the second row candidate object as the grid-format object is described in detail with reference to FIG. 13.

According to this embodiment, even when the implemented UI control does not provide the automation characteristic information of the grid-format object, the RPA solution may identify the implemented UI control as the grid-format object. Therefore, according to this embodiment, there is an advantage in that automation of work processing through the RPA solution may be easily implemented.

Hereinafter, with reference to FIG. 5 to FIG. 8, the scheme in which the row candidate search module 10 determines the row candidate object is described in detail.

Figure 5:
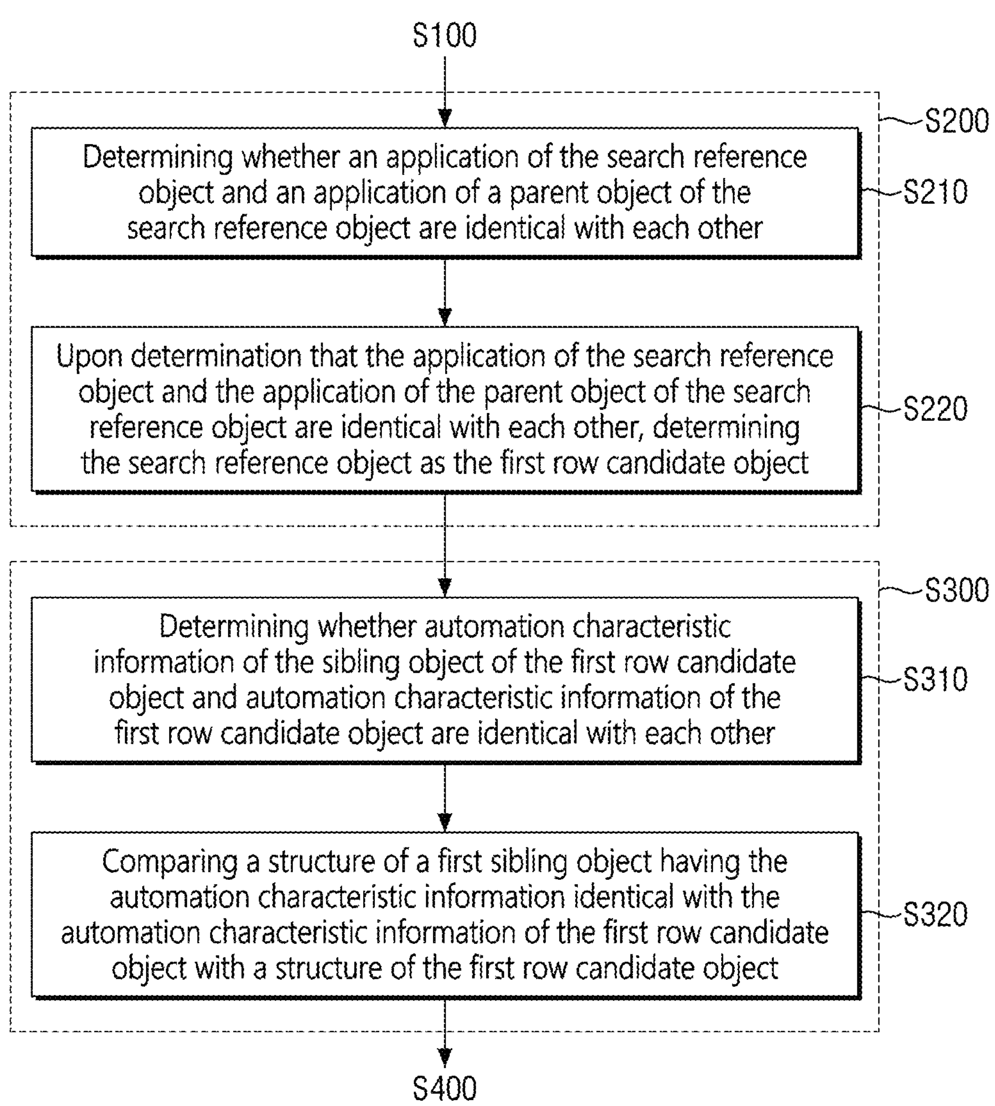
FIG. 5 is a detailed flowchart for illustrating some operations of a method for identifying a grid-format object in an RPA environment as described above with reference to FIG. 3.

First, with reference to FIG. 5, all operations of the row candidate search module 10 are described. FIG. 5 is a detailed flowchart for illustrating some operations of the method for identifying the grid-format object in the RPA environment as described with reference to FIG. 3.

With reference to FIG. 5, when determining the first row candidate object in S210, the row candidate search module 10 may determine whether ab application of the search reference object input from the user terminal and an application of the parent object of the search reference object are identical with each other. When the input search reference object is not a row candidate object, the parent object of the search reference object may be redesignated as the search reference object. In this regard, the parent object of the pre-designated search reference object is a parent object in the hierarchical structure tree, but the parent object may be an object belonging to a different program from a program to which the pre-designated search reference object belongs to. In this case, the pre-designated search reference object and the parent object of the pre-designated search reference object cannot be determined as the information of the grid-format structure that are displayed on the same UI screen. Thus, the row candidate search module 10 may determine whether the application of the pre-designated search reference object and the application of the parent object of the search reference object are identical with each other.

Thereafter, only when it is determined that the application of the pre-designated search reference object and the application of the parent object of the pre-designated search reference object are identical with each other, the row candidate search module 10 may determine the pre-designated search reference object as the first row candidate object in S220.

Thereafter, the row candidate search module 10 may determine whether the automation characteristic information of the sibling object of the determined first row candidate object and the automation characteristic information of the first row candidate object are identical with each other in S310. In this case, there may be a plurality of sibling objects of the first row candidate object. The row candidate search module 10 may determine whether the automation characteristic information of the sibling object positioned on the left side of the first row candidate object and the automation characteristic information of the sibling object positioned on the right side of the first row candidate object are identical with each other and determine the second row candidate based on the determination result. When the row candidate search module 10 determines whether the automation characteristic information thereof are identical with each other, an order in which the sibling objects are determined is irrelevant. A scheme in which the row candidate search module 10 determines whether the automation characteristic information of the sibling object of the first row candidate object and the automation characteristic information of each of the first row candidate objects are identical with each other will be described in detail with reference to FIG. 7 and FIG. 8.

In one embodiment, the row candidate search module 10 determines that there is no sibling object of the first row candidate object having the automation characteristic information identical with the automation characteristic information of the first row candidate object, based on the determination result of whether the automation characteristic information of the sibling object of the first row candidate object and the automation characteristic information of the first row candidate object are identical with each other. In this case, the row candidate search module 10 may determine the parent object of the first row candidate object as the first row candidate object. Thereafter, the row candidate search module 10 may recursively execute the steps S210, S220 and S310 until the sibling object having the automation characteristic information identical with the automation characteristic information of the first row candidate object has been detected.

According to the present embodiment, the above process may be recursively executed until the sibling object having the automation characteristic information identical with the automation characteristic information of the first row candidate object, that is, the second row candidate object has been detected, thereby ensuring that the second row candidate object is detected.

According to the above embodiment, under assuming that the sibling object having the automation characteristic information identical with the automation characteristic information of the first row candidate object has been detected, following description will be made again with reference to FIG. 5.

Figure 6:
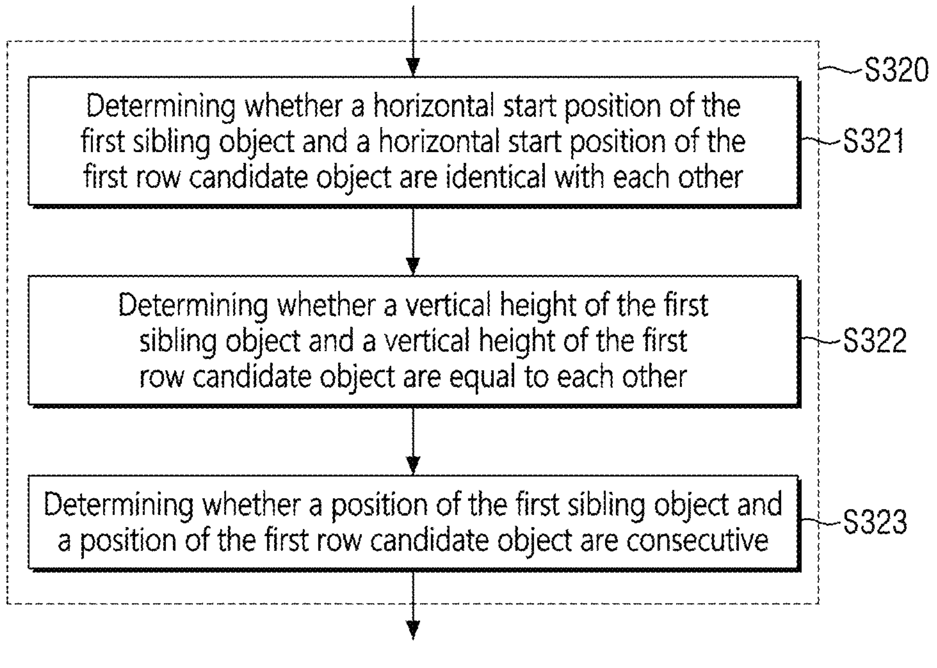
FIG. 6 is a detailed flowchart for illustrating some operations of a method for identifying a grid-format object in an RPA environment as described above with reference to FIG. 5.

Thereafter, the row candidate search module 10 may compare a structure of the first sibling object having the automation characteristic information identical with the automation characteristic information of the first row candidate object with a structure of the first row candidate object in S320. Hereinafter, with reference to FIG. 6, a scheme in which the row candidate search module 10 compares the structure of the first sibling object with the structure of the first row candidate object will be described. FIG. 6 is a detailed flowchart for illustrating some operations of the method for identifying the grid-format object in the RPA environment as described with reference to FIG. 5.

In one embodiment, the row candidate search module 10 may determine whether a horizontal start position of the first sibling object and a horizontal start position of the first row candidate object coincide with each other in S321. In information of the general grid-format structure, objects in the same row are positioned at the same horizontal start position. Thus, it is determined whether the horizontal start position of the first sibling object and the horizontal start position of the first row candidate object coincide with each other.

Afterwards, the row candidate search module 10 may determine whether a vertical height of the first sibling object and a vertical height of the first row candidate object are identical with each other in S322. In information of the general grid-format structure, objects in the same row have the same vertical height. Thus, it is determined whether the vertical height of the first sibling object and the vertical height of the first row candidate object are identical with each other.

Afterwards, the row candidate search module 10 may determine whether positions of the first sibling object and the first row candidate object are consecutive in S323. In information of the general grid-format structure, adjacent rows are arranged consecutively. Thus, whether the positions of the first sibling object and the first row candidate object are consecutive is determined. Whether the positions of the first sibling object and the first row candidate object are consecutive may be determined using position information that indicates a position of each object on the UI screen.

In one embodiment, there may be a case where the horizontal start position of the first sibling object and the horizontal start position of the first row candidate object do not coincide with each other. This means that each of the first sibling object and the first row candidate object cannot be a starting row of the grid-format object. That is, this means that the first sibling object and the first row candidate object cannot be a pair of row candidate objects. In this case, the row candidate search module 10 may determine the parent object of the first row candidate object as the first row candidate object. Thereafter, the row candidate search module 10 may recursively execute steps S210, S220, S310, and S320 of FIG. 5 until the pair of row candidate objects having the same automation characteristic information and the same structure has been detected.

According to this embodiment, the steps S210, S220, S310, and S320 of FIG. 5 may be recursively executed until the pair of row candidate objects having the same automation characteristic information and the same structure has been detected, thereby ensuring that the first row candidate object and the second row candidate object can be detected.

In one embodiment, there may be a case where the vertical height of the first sibling object is not equal to the vertical height of the first row candidate object. This may mean that the first sibling object and the first row candidate object do not have a row relationship with each other and include completely different information. That is, the first sibling object and the first row candidate object cannot be the pair of row candidate objects. In this case, the row candidate search module 10 may determine the parent object of the first row candidate object as the first row candidate object. Thereafter, the row candidate search module 10 may recursively execute steps S210, S220, S310, and S320 of FIG. 5 until the pair of row candidate objects having the same automation characteristic information and the same structure has been detected.

According to the present embodiment, the grid-format object identification system 1 may recursively execute steps S210, S220, S310, and S320 of FIG. 5 until the pair of row candidate objects having the same automation characteristic information and the same structure has been detected, thereby ensuring that the first row candidate object and the second row candidate object can be detected.

In one embodiment, there may be a case where the positions of the first sibling object and the first row candidate object are not consecutive. This means that the first sibling object and the first row candidate object are not adjacent rows, and that the first sibling object and the first row candidate object do not constitute a grid-format structure with each other. In other words, the first sibling object and the first row candidate object cannot be the pair of row candidate objects. In this case, the row candidate search module 10 may determine the parent object of the first row candidate object as the first row candidate object. Thereafter, the row candidate search module 10 may recursively execute steps S210, S220, S310 and S320 of FIG. 5 until the pair of row candidate objects having the same automation characteristic information and the same structure has been detected.

According to this embodiment, the grid-format object identification system 1 may recursively execute steps S210, S220, S310 and S320 of FIG. 5 until the pair of row candidate objects having the same automation characteristic information and the same structure has been detected, thereby ensuring that the first row candidate object and the second row candidate object can be detected.

Figure 7:
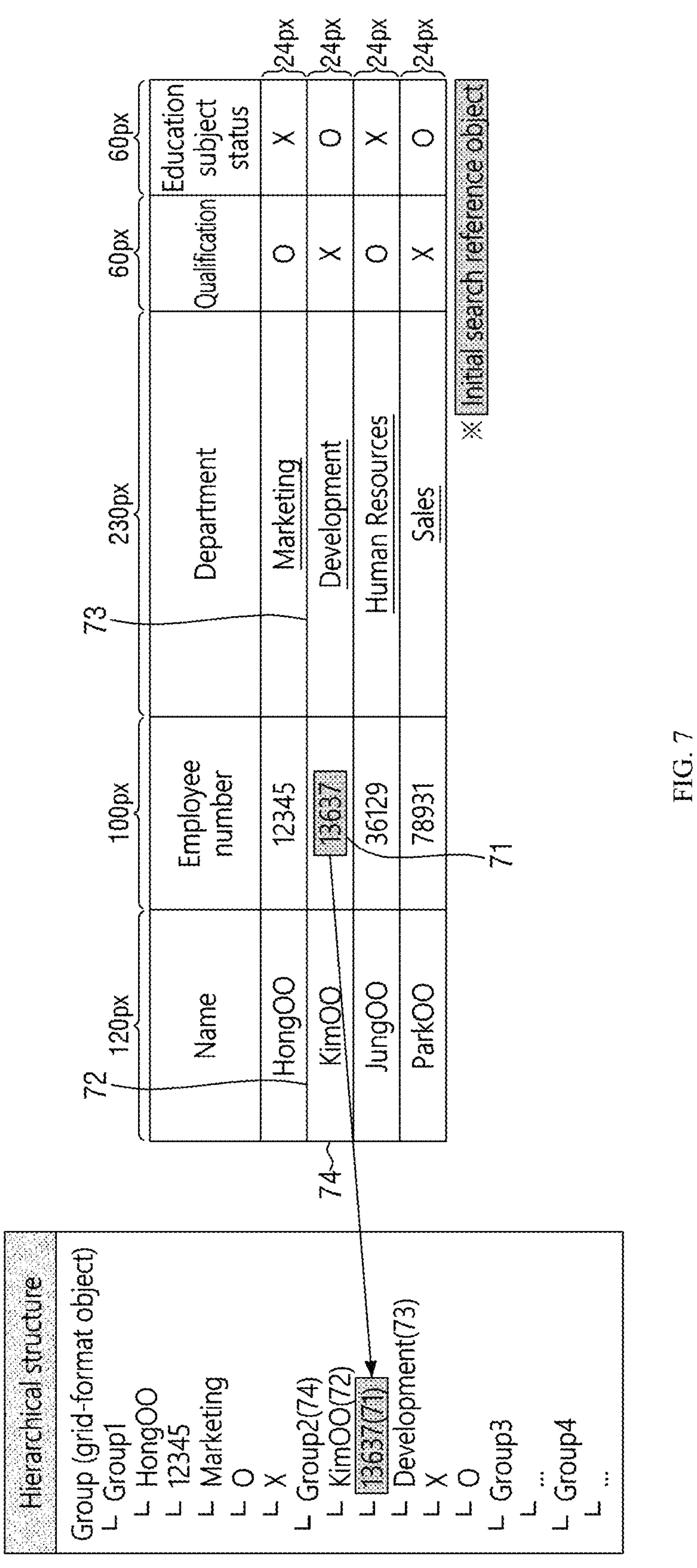
FIG. 7 and FIG. 8 are example diagrams illustrating a process for determining a row candidate object according to still another embodiment of the present disclosure.
Figure 8:
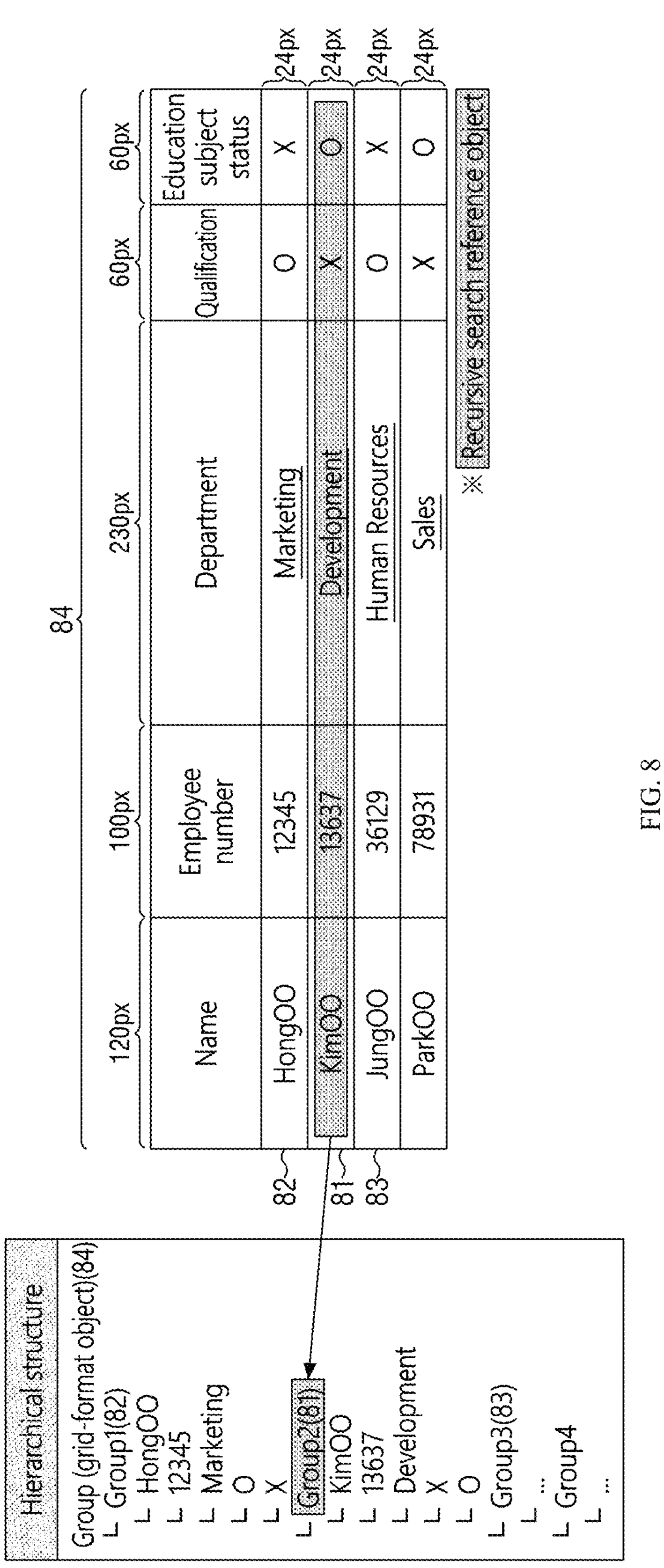

Hereinafter, with reference to FIG. 7 and FIG. 8, a method for determining the first row candidate object and the second row candidate object will be described. FIG. 7 and FIG. 8 are example diagrams illustrating a process of determining a row candidate object according to another embodiment of the present disclosure.

Referring to FIG. 7, information of a grid-format structure, a search reference object 71 input from the user terminal 2, and sibling objects 72 and 73 of the search reference object 71 are illustrated. The row candidate search module 10 may determine whether the application of the search reference object 71 and the application of the parent object 74 of the search reference object 71 are identical with each other. It is determined that the application of the search reference object 71 and the application of the parent object 74 of the search reference object 71 are identical with each other. In other words, the search reference object 71 and the parent object 74 are grid-format information displayed on the same UI screen and are objects belonging to the same program.

Afterwards, the row candidate search module 10 may determine whether the search reference object 71, the first sibling object 72 positioned on the left side of the search reference object 71, and the second sibling object 73 positioned on the right side have the same automation characteristic information. It is assumed that as a result of the determination, all of respective object types, object positions and sizes, UI class names, and UI object frameworks included in the automation characteristic information of the search reference object 71, the first sibling object 72 and the second sibling object 73 are identical with each other. Therefore, each of the first sibling object 72 and the second sibling object 73 may be qualified as the second row candidate object.

Afterwards, the row candidate search module 10 may compare the structures of the search reference object 71, the first sibling object 72 and the second sibling object 73 with each other. As a result of the comparison, all of the horizontal start position of the search reference object 71, the horizontal start position of the first sibling object 72 and the horizontal start position of the second sibling object 73 are different from each other, so that all of the structure of the search reference object 71, the structure of the first sibling object 72 and the structure of the search reference object 71, and the structure of the second sibling object 73 are different from each other. Therefore, the search reference object 71 cannot be determined as the first row candidate object, and likewise, the first sibling object 72 and the second sibling object 73 cannot be determined as the second row candidate object.

Afterwards, upon determination that all of the structure of the search reference object 71, the structure of the first sibling object 72 or the structure of the second sibling object 73 are not identical with each other, the row candidate search module 10 may determine the parent object 74 of the search reference object 71 as the first row candidate. Afterwards, the row candidate search module 10 may execute steps S210, S220, S310, and S320 of FIG. 5 until the pair of row candidate objects having the same automation characteristic information and the same structure has been detected.

Referring to FIG. 8, a search reference object 81 and sibling objects 82 and 83 of the search reference object 81 that are re-designated through the process illustrated in FIG. 7 are illustrated.

The row candidate search module 10 may determine whether an application of the search reference object 81 and an application of a parent object 84 of the search reference object 81 are identical with each other. It is determined that the applications of the search reference object 81 and the parent object 84 are identical with each other. That is, the search reference object 81 and the parent object 84 are grid-format information displayed on the same UI screen and are objects belonging to the same program.

Thereafter, the row candidate search module 10 may determine whether automation characteristic information of the search reference object 81, automation characteristic information of the first sibling object 82 positioned on top of the search reference object 81, and automation characteristic information of the second sibling object 83 positioned under the search reference object 81 are identical with each other. It is assumed that as a result of the determination, all of respective object types, object positions and sizes, UI class names, and UI object frameworks included in the automation characteristic information of the search reference object 81, the automation characteristic information of the first sibling object 82, and the automation characteristic information of the second sibling object 83 are identical with each other. Therefore, each of the first sibling object 82 and the second sibling object 83 may be qualified as the second row candidate object.

Afterwards, the row candidate search module 10 may compare the structure of the search reference object 81 with the structure of each of the first sibling object 82 and the second sibling object 83. As a result of the comparison, the horizontal start position of the search reference object 81 and the horizontal start positions of the first sibling object 82 and the second sibling object 83 are identical with each other; all of the vertical height of the search reference object 81 and the vertical heights of the first sibling object 82 and the second sibling object 83 are 24 px and thus are identical with each other; and the first sibling object 82, the search reference object 81, and the second sibling object 83 are arranged consecutively based on the position information thereof indicating the positions of the search reference object 81, the first sibling object 82, and the second sibling object 83 on the UI screen. Thus, the structures of the search reference object 81, the first sibling object 82, and the second sibling object 83 are identical with each other. Therefore, the search reference object 81 may be determined as the first row candidate object, and likewise, each of the first sibling object 82 and the second sibling object 83 may also be determined as the second row candidate object. In accordance with the present disclosure, for the convenience of description, under example assumption that the second sibling object 83 is determined as the second row candidate object, following description will be made.

The following description will be made on the assumption that the first row candidate and the second row candidate have been determined through the above process.

Figures 9, 10:
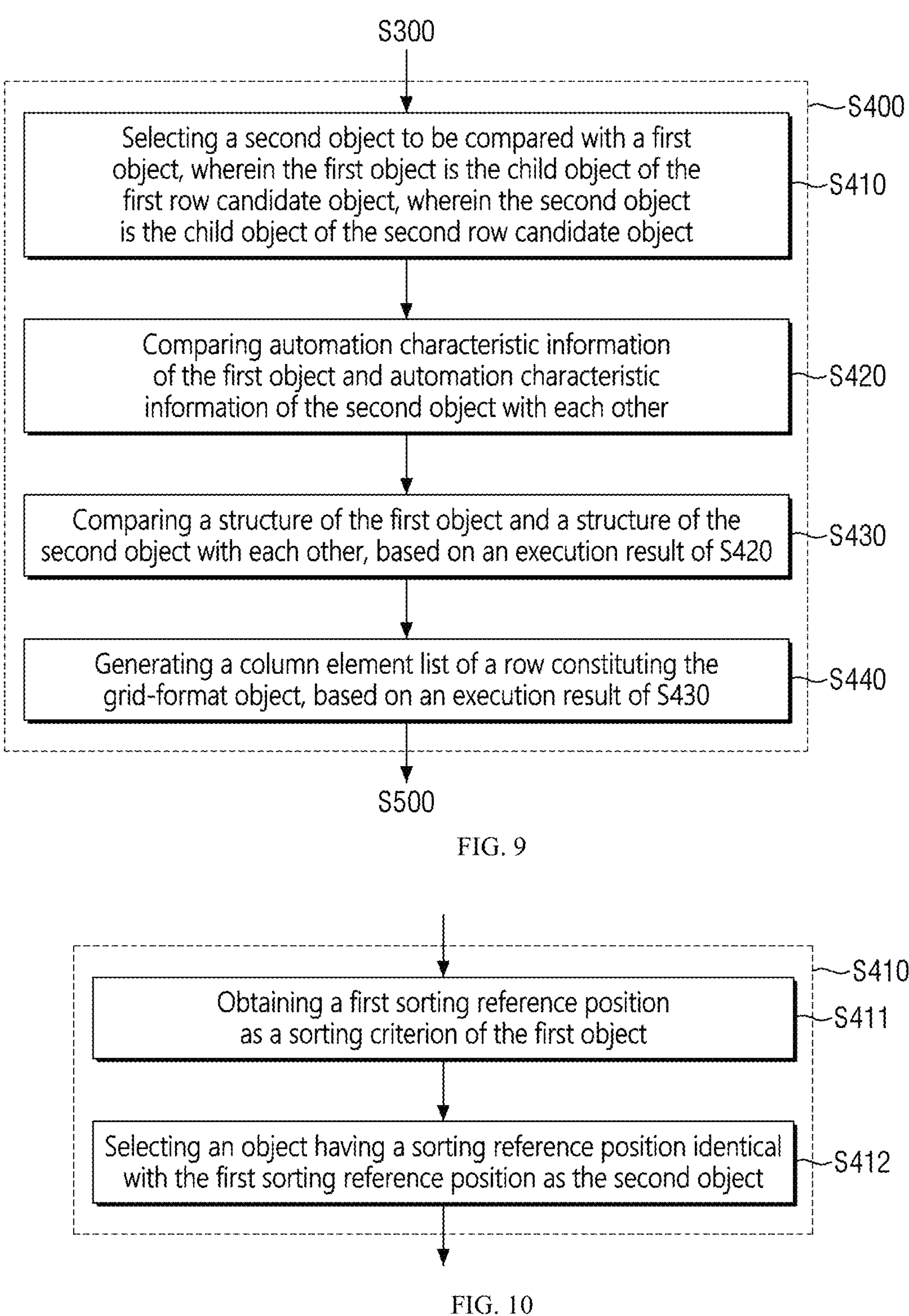
FIG. 9 is a detailed flowchart for illustrating some operations of a method for identifying a grid-format object in an RPA environment as described above with reference to FIG. 3.
FIG. 10 is a detailed flowchart for illustrating some operations of a method for identifying a grid-format object in an RPA environment as described above with reference to FIG. 9.

Hereinafter, with reference to FIG. 9, a method for determining whether a child object of the first row candidate object and a child object of the second row candidate object satisfy a column relationship with each other is described. FIG. 9 is a detailed flowchart for illustrating some operations of a method for identifying a grid-format object in an RPA environment as described with reference to FIG. 3.

Referring to FIG. 9, the column information analysis module 20 may select a second object to be compared with a first object as a child object of the first row candidate object in S410. The second object may be one of child objects of the second row candidate object. Hereinafter, referring to FIG. 10, a method for selecting the second object is described. FIG. 10 is a detailed flowchart for illustrating some operations of the method for identifying the grid-format object in an RPA environment as described with reference to FIG. 9.

Referring to FIG. 10, the column information analysis module 20 may obtain a first sorting reference position as a sorting criterion of the first object S411. The sorting criterion may include at least one of left sorting, right sorting, and center sorting.

Afterwards, the column information analysis module 20 may select an object having a sorting reference position identical with the first sorting reference position as the second object as the comparison target with the first object in S412.

In information of the general grid-format structure, information belonging to the same column usually represent information of the same characteristic. However, depending on a program implementation scheme, the information included in the column is larger than the size of the column. Alternatively, the position and size of the column may change or be hidden depending on a specific situation, such as a situation when the mouse passes over the column. In this case, when the column information analysis module 20 has selected the second object simply based on the comparing result of the position and size of the column, an incorrect comparison target may be selected. Therefore, in order to select the comparison target with the first object as the child object of the first row candidate object, the column information analysis module 20 obtains the sorting reference position of the first object, and selects an object having a sorting reference position identical with the sorting reference position of the first object as the second object as the comparison target.

The column information analysis module 20 may repeatedly perform S411 and S412 steps until the second object satisfying the above condition has been selected.

Descriptions will be made with reference back to FIG. 9.

Thereafter, the column information analysis module 20 may compare the automation characteristic information of the first object and the automation characteristic information of the second object with each other in S420.

In one embodiment, when the automation characteristic information of the first object and the automation characteristic information of the second object are identical with each other, the object types, the object positions and sizes, the UI class names, and the frameworks of the first object and the second object are identical with each other. This means that the first object and the second object include information of the same characteristic. A specific row included in the information of the grid-format structure should include information of the same characteristic as that of the first object or the second object. Therefore, in this case, the column information analysis module 20 may determine that the first object is an essential column element constituting a row of the grid-format object, and add the first object to the column element list. The column element list means a list including essential column elements required for each row to be identified as the grid-format object.

According to this embodiment, the column element list may be generated based on the comparing result of the child objects of the first row candidate object and the second row candidate object, such that a time taken for determining whether another row candidate object may be identified as a grid-format object may be shortened.

Descriptions will be made with reference back to FIG. 9.

The column information analysis module 20 may compare the structure of the first object and the structure of the second object with each other, based on the result of the execution of step S420 in S430. According to the above-described embodiment, when the respective automation characteristic information of the first object and the second object are identical with each other, the column information analysis module 20 may add the first object to the column element list. However, there may be cases where the respective automation characteristic information of the first object and the second object are not identical with each other. In this case, the column information analysis module 20 may compare the structure of the first object and the structure of the second object with each other and may determine whether to add the first object (or the second object) to the column element list, based on the comparing result.

In one embodiment, when the respective automation characteristic information of the first object and the second object are not identical with each other, the column information analysis module 20 may compare a horizontal width of the first object and a horizontal width of the second object with each other. When the horizontal width of the first object and the horizontal width of the second object are equal to each other based on a result of comparing the horizontal width of the first object and the horizontal width of the second object with each other, there is a possibility that the first object or the second object may be a column including other information than standardized information even though the automation characteristic information of the first object and the automation characteristic information of the second object are not identical with each other. Thus, the column information analysis module 20 may add the first object (or the second object) to the column element list.

For example, it is assumed that the first object and the second object indicate information about departments, and that the first object indicates information 'Development' and the second object indicates information 'Human Resources'. In this regard, a case in which when the user positions the mouse on the first object, a pop-up indicating that the department has been changed from the 'Human Resources' department to the 'Development' department may be displayed, whereas when the user positions the mouse on the second object, the pop-up is not displayed may occur. In this case, the respective automation characteristic information of the first object and the second object are different from each other. However, both the first object and the second object indicate information about the department, and thus should be added to the column element list. Therefore, when the structures, that is, the horizontal widths of the first and second objects are equal to each other even though the respective automation characteristic information of the first object and the second object are not identical with each other, as described above, the column information analysis module 20 is configured to add the first and second objects to the column element list.

According to this embodiment, whether the object is an essential column element that constitutes the row may be flexibly determined, such that an accurate grid-format object may be identified in the RPA environment.

In one embodiment, there may be a case where the automation characteristic information of the first object and the automation characteristic information of the second object are not identical with each other, and the horizontal width of the first object and the horizontal width of the second object also are not equal with each other. In this case, this means that each of the first object and the second object cannot be a column element constituting the row of the grid-format object. In other words, this means that the first object and the second object do not belong to the same column, and furthermore, this means that the first row candidate object and the second row candidate object are not rows constituting the grid-format object. Therefore, in this case, the grid-format object identification system 1 may determine the parent object of the search reference object as the first row candidate object. Thereafter, the grid-format object identification system 1 may perform steps S200 to S400 again.

Descriptions will be made with reference back to FIG. 9.

The column information analysis module 20 may generate a column element list of a row constituting the grid-format object based on the result of performing step S430 S440.

According to this embodiment, the column element list may be generated based on the determining result of whether the child object of the first row candidate object and the child object of the second row candidate object satisfy the column relationship with each other, such that the time taken for determining whether another row candidate object may be identified as the grid-format object may be shortened.

Figure 11:
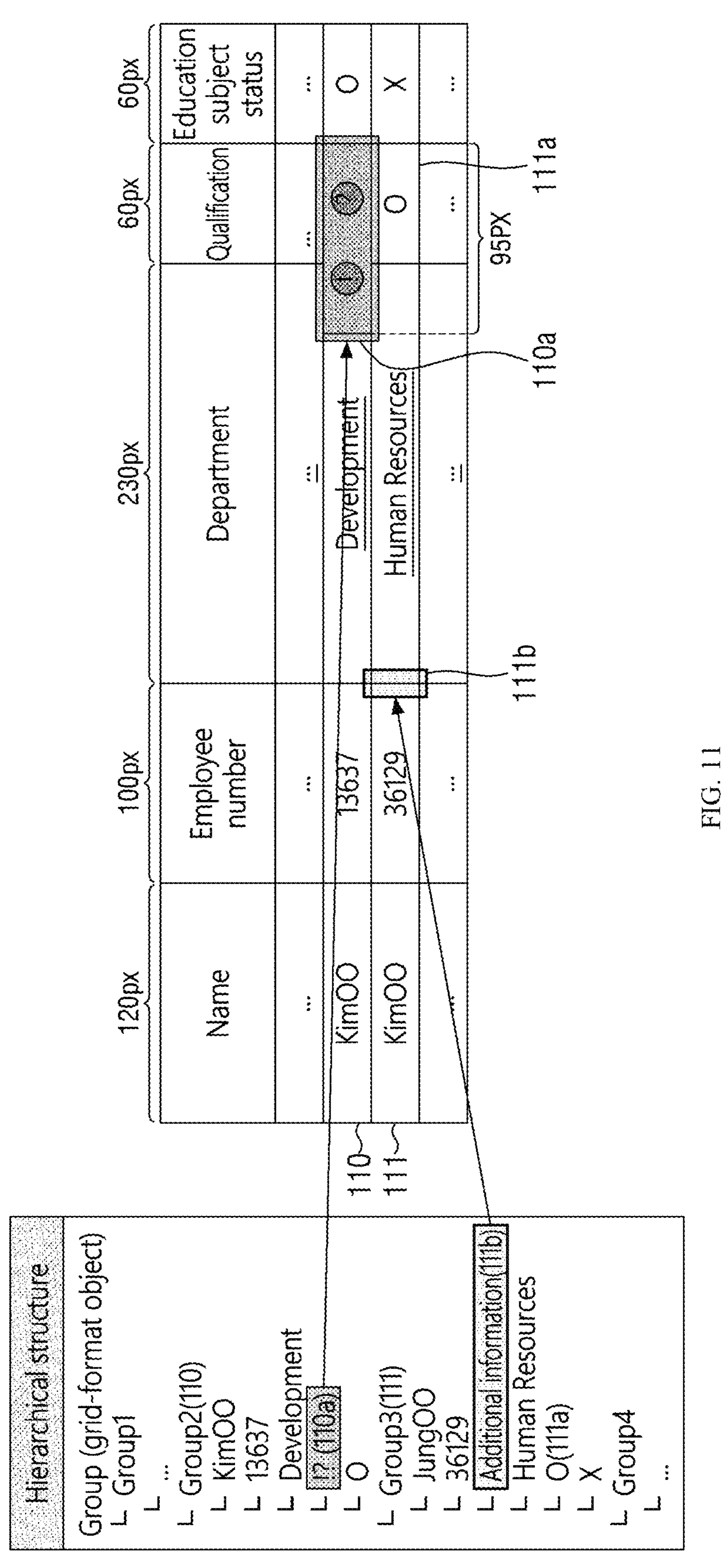
FIG. 11 is an example diagram for illustrating a column information analysis process according to still another embodiment of the present disclosure.

Hereinafter, an operation of the column information analysis module will be described with reference to FIG. 11 and FIG. 12. FIG. 11 is an example diagram for illustrating a column information analysis process according to still another embodiment of the present disclosure, and FIG. 12 is an example diagram for illustrating a column information analysis result according to still yet another embodiment of the present disclosure.

Referring to FIG. 11, a first row candidate object 110, a second row candidate object 111, a child object of the first row candidate object 110, and a child object of the second row candidate object 111 are illustrated.

The column information analysis module 20 obtains a sorting reference position of each of the child objects of the first row candidate object 110, and selects each child object of the second row candidate object 111 as an object having a sorting reference position identical with the obtained sorting reference position.

After the selection, a column comparison object including the name information of 'Kim OO' is matched with a column comparison object including the name information of 'Jeong OO'. A column comparison object including the employee number information of '13637' is matched with a column comparison object including the employee number information of '36129'. A column comparison object including the department information of 'Development' is matched with a column comparison object including the department information of 'Human Resources'. A column comparison object including the qualification acquisition information of '!?' is matched with a column comparison object including the qualification acquisition information of 'O'. A column comparison object including the education subject information of 'O' is matched with a column comparison object including the education subject information of 'X'.

In this regard, a column comparison object 110*a* including qualification acquisition information which is a child object of the first row candidate object 110 has an object size of 95 px which is larger than 60 px as a size of the column comparison object 111*a* including qualification acquisition information which is a child object of the second row candidate object 111. However, the sorting reference position of the column comparison object 110*a* and the sorting reference position of the column comparison object 111*a* are both the right sorting and thus are identical with each other. Thus, the column comparison object 110*a* and the column comparison object 111*a* match each other as comparison targets with each other.

In one example, the second row candidate object 111 may have a column comparison object 111*b* including additional information as a child object thereof. In this case, the first row candidate object 111 does not have a column comparison object that has a sorting reference position that may be compared with that of the column comparison object 111*b*. Therefore, the column comparison object 111*b* is excluded from a list of comparison targets with the column element of each of the first row candidate object 110 and the second row candidate object 111.

The column information analysis module 20 may determine whether the first row candidate object and the second row candidate object are some of the rows constituting the grid-format object, and may generate the column element list through the above-described process.

Hereinafter, with reference to FIG. 13, a method for identifying information of a grid-format structure as a grid-format object is described. FIG. 13 is a detailed flowchart for illustrating some operations of the method for identifying the grid-format object in the RPA environment as described with reference to FIG. 3.

Figure 13:
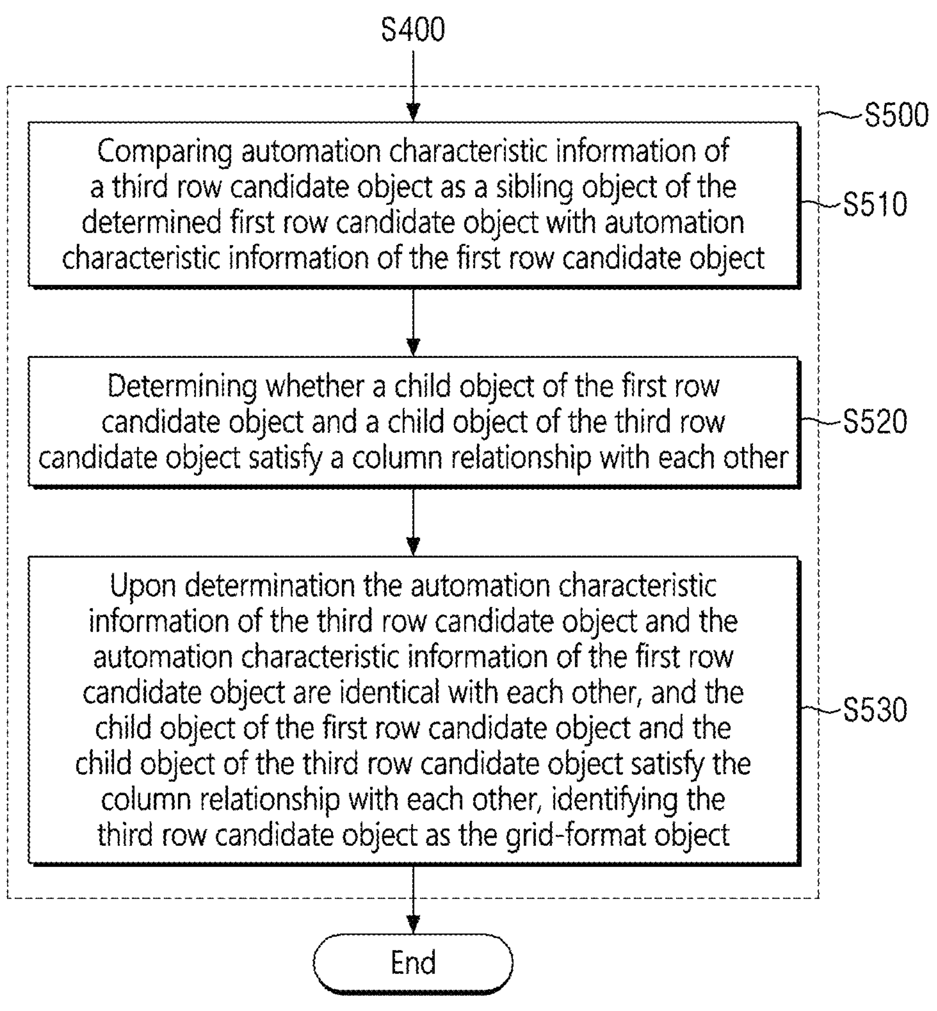
FIG. 13 is a detailed flowchart for illustrating some operations of a method for identifying a grid-format object in an RPA environment as described above with reference to FIG. 3.

With reference to FIG. 13, the grid-format object determination module 30 may compare the automation characteristic information of a third row candidate object as the sibling object of the first row candidate object as determined through steps S200 to S400 with the automation characteristic information of the first row candidate object in S510. When the first row candidate object is determined to be a row constituting a grid-format object, the possibility that another sibling object of the first row candidate object may be also a row constituting the grid-format object increases.

Afterwards, the grid-format object determination module 30 may determine whether the child object of the first row candidate object and the child object of the third row candidate object satisfy the column relationship with each other in S520. The grid-format object determination module 30 may determine whether the third row candidate object includes all of objects of the same characteristics as that of the object included in the column element list as generated through step S400. When it is determined that the third row candidate object includes all of objects of the same characteristics as that of the object included in the column element list, it may be determined that the child object of the third row candidate object and the child object of the first row candidate object satisfy the column relationship with each other. On the other hand, when it is determined that the third row candidate object does not include the object of the same characteristic as that of the object included in the column element list, it may be determined that the child object of the third row candidate object and the child object of the first row candidate object do not satisfy the column relationship with each other.

Afterwards, upon determination that the automation characteristic information of the third row candidate object and the automation characteristic information of the first row candidate object are identical with each other, and the child object of the first row candidate object and the child object of the third row candidate object satisfy the column relationship with each other, the grid-format object determination module 30 may identify the third row candidate object as the grid-format object including the first row candidate object and the second row candidate object in S530.

The above-described steps S510 to S530 may be performed on all of sibling objects of the first row candidate object.

According to this embodiment, even when the implemented UI control does not provide the automation characteristic information of the grid-format object, the RPA solution may identify the object as the object of the grid-format structure. Therefore, according to this embodiment, the automation of work processing through the RPA solution may be easily implemented.

Figure 14:
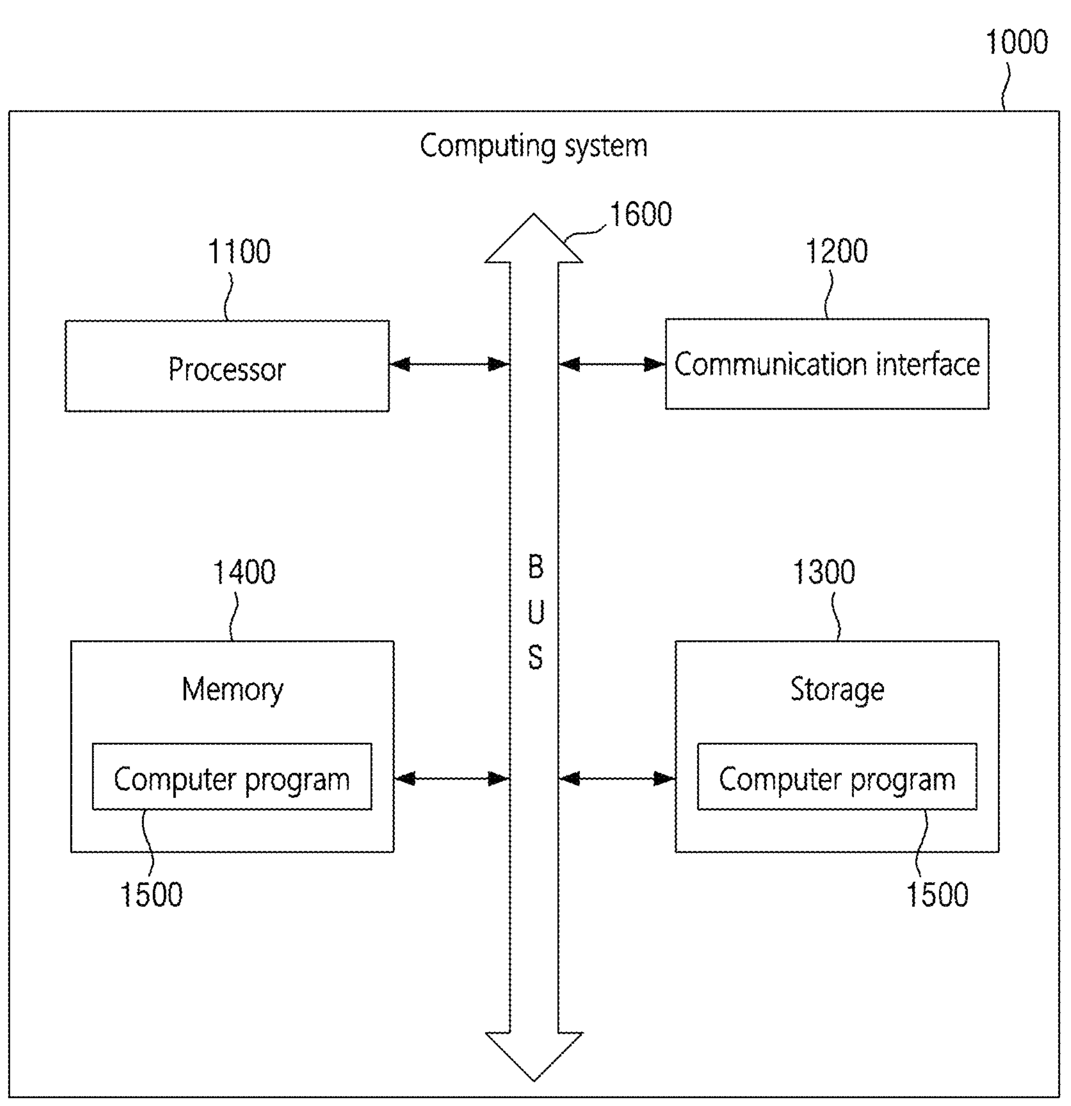
FIG. 14 is a hardware configuration diagram of a computing system described in some embodiments of the present disclosure.

FIG. 14 is a hardware configuration diagram of a computing system according to some embodiments of the present disclosure. The computing system 1000 of FIG. 14 may include one or more processors 1100, a system bus 1600, a communication interface 1200, a memory 1400 that loads thereon a computer program 1500 executed by the processor 1100, and a storage 1300 that stores therein the computer program 1500.

The computing system 1000 of FIG. 14 may present a hardware structure of one or more computing systems that constitute the grid-format object identification system 1 in the RPA environment according to some embodiments of the present disclosure as described with reference to FIG. 2.

The processor 1100 controls all operations of each of the components of the computing system 1000. The processor 1100 may perform computations for at least one application or program for executing methods/operations according to various embodiments of the present disclosure. The memory 1400 stores therein various data, commands, and/or information. The memory 1400 may load thereon one or more computer programs 1500 from the storage 1300 to execute methods/operations according to various embodiments of the present disclosure. The storage 1300 may non-temporarily store therein one or more computer programs 1500.

The computer program 1500 may include one or more instructions for executing methods/operations according to various embodiments of the present disclosure. When the computer program 1500 has been loaded onto the memory 1400, the processor 1100 may execute the one or more instructions to perform the methods/operations according to various embodiments of the present disclosure.

In one embodiment, the computer program 1500 may include instructions for performing an operation of receiving a search reference object; an operation of searching for an ancestor object of the search reference object on a hierarchical structure tree and determining the searched ancestor object as a first row candidate object; an operation of determining a sibling object of the first row candidate object on the hierarchical structure tree as a second row candidate object; an operation of determining whether a child object of the first row candidate object and a child object of the second row candidate object satisfy a column relationship with each other on the hierarchical structure tree; and an operation of identifying each of the first row candidate object and the second row candidate object as a grid-format object, based on the determination result.

In one embodiment, the operation of identifying of each of the first row candidate object and the second row candidate object as the grid-format object, based on the determination result may include an operation of comparing automation characteristic information of a third row candidate object as a sibling object of the determined first row candidate object with automation characteristic information of the first row candidate object; an operation of determining whether a child object of the first row candidate object and a child object of the third row candidate object satisfy a column relationship with each other; and an operation of identifying the third row candidate object as the grid-format object, upon determination the automation characteristic information of the third row candidate object and the automation characteristic information of the first row candidate object are identical with each other, and the child object of the first row candidate object and the child object of the third row candidate object satisfy the column relationship with each other.

So far, a variety of embodiments of the present disclosure and the effects according to embodiments thereof have been mentioned with reference to FIGS. 1 to 14. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for automating work processing by traversing items in a grid-format structure using a robotic process automation (RPA) technology, by identifying a user interface (UI) object displayed on a screen using a non-grid-format UI control in an RPA environment, as a grid-format object, the method being performed by a computing device, wherein the method comprises:

receiving, via a user interface (UI), a search reference object, which is an UI object designated by a user and displayed using a non-grid-format UI control of a target work program, wherein the search reference object is visually expressed as a grid-format UI structure on a screen of the target work program, and the non-grid-format UI control does not provide information about each of rows and each of columns in the grid-format UI structure;

providing, by an operating system, automation characteristic information including a position, a size, and a control type of the UI object expressed by a node of a hierarchical structure tree;

searching for an ancestor object of the search reference object on the hierarchical structure tree and determining the searched ancestor object as a first row candidate object, using the automation characteristic information provided by the operating system, wherein the determining of the searched ancestor object as the first row candidate object includes:

(i) determining whether an application of the search reference object and an application of a parent object of the search reference object are identical with each other based on whether the search reference object and the parent object are grid-format information displayed on the same UI screen and are objects belonging to the same program; and (ii) upon determination that the application of the search reference object and the application of the parent object of the search reference object are identical with each other, determining the search reference object as the first row candidate object;

determining a sibling object of the first row candidate object on the hierarchical structure tree as a second row candidate object, by using automation characteristic information of the first row candidate object and automation characteristic information of the sibling object of the first row candidate object, wherein the determining of the sibling object of the first row candidate object as the second row candidate object includes:

(iii) determining whether the automation characteristic information of the sibling object of the first row candidate object and the automation characteristic information of the first row candidate object are identical with each other; and (iv) comparing a structure of a first sibling object having the automation characteristic information identical with the automation characteristic information of the first row candidate object with a structure of the first row candidate object;

determining whether a child object of the first row candidate object and a child object of the second row candidate object satisfy a column relationship with each other on the hierarchical structure tree;

identifying each of the first row candidate object and the second row candidate object as a grid-format object, based on a result of determination on the column relationship; and creating an automation scenario that performs automated work processing by traversing items of the grid-format object, wherein steps (i)-(iv) are recursively performed until a pair of the first row candidate object and the second row candidate object having the same automation characteristic information and the same structure has been detected.

2. The method for identifying the grid-format object in the RPA environment of claim 1, wherein the determining of whether the automation characteristic information of the sibling object of the first row candidate object and the automation characteristic information of the first row candidate object are identical with each other includes:

upon determination that there is no sibling object having the automation characteristic information identical with the automation characteristic information of the first row candidate object, determining a parent object of the first row candidate object as the first row candidate object.

3. The method for identifying the grid-format object in the RPA environment of claim 1, wherein the comparing of the structure of the first sibling object having the automation characteristic information identical with the automation characteristic information of the first row candidate object with the structure of the first row candidate object includes:

determining whether a horizontal start position of the first sibling object and a horizontal start position of the first row candidate object are identical with each other;

determining whether a vertical height of the first sibling object and a vertical height of the first row candidate object are equal to each other; and determining whether a position of the first sibling object and a position of the first row candidate object are consecutive.

4. The method for identifying the grid-format object in the RPA environment of claim 3, wherein the determining of whether the horizontal start position of the first sibling object and the horizontal start position of the first row candidate object are identical with each other includes:

upon determination that the horizontal start position of the first sibling object and the horizontal start position of the first row candidate object are not identical with each other, determining a parent object of the first row candidate object as the first row candidate object.

5. The method for identifying the grid-format object in the RPA environment of claim 3, wherein the determining of whether the vertical height of the first sibling object and the vertical height of the first row candidate object are equal to each other includes:

upon determination that the vertical height of the first sibling object and the vertical height of the first row candidate object are not equal to each other, determining a parent object of the first row candidate object as the first row candidate object.

6. The method for identifying the grid-format object in the RPA environment of claim 3, wherein the determining of whether the position of the first sibling object and the position of the first row candidate object are consecutive includes:

upon determination that the position of the first sibling object and the position of the first row candidate object are not consecutive, determining a parent object of the first row candidate object as the first row candidate object.

7. The method for identifying the grid-format object in the RPA environment of claim 1, wherein the determining of whether the child object of the first row candidate object and the child object of the second row candidate object satisfy the column relationship with each other includes:

selecting a second object to be compared with a first object, wherein the first object is the child object of the first row candidate object, wherein the second object is the child object of the second row candidate object;

comparing automation characteristic information of the first object and automation characteristic information of the second object with each other;

comparing a structure of the first object and a structure of the second object with each other, based on a result of the comparing between the automation characteristic information of the first and second objects; and generating a column element list of a row constituting the grid-format object, based on a result of the comparing between the structures of the first and second structures.

8. The method for identifying the grid-format object in the RPA environment of claim 7, wherein the selecting of the second object to be compared with the first object includes:

obtaining a first sorting reference position as a sorting criterion of the first object; and selecting an object having a sorting reference position identical with the first sorting reference position as the second object, and wherein the sorting criterion includes at least one of left sorting, right sorting, and center sorting.

9. The method for identifying the grid-format object in the RPA environment of claim 7, wherein the comparing of the structure of the first object and the structure of the second object with each other includes:

upon determination that the automation characteristic information of the first object and the automation characteristic information of the second object are identical with each other, adding the first object to the column element list.

10. The method for identifying the grid-format object in the RPA environment of claim 7, wherein the comparing of the structure of the first object and the structure of the second object with each other includes:

upon determination that the automation characteristic information of the first object and the automation characteristic information of the second object are not identical with each other, comparing a horizontal width of the first object with a horizontal width of the second object; and upon determination that the horizontal width of the first object and the horizontal width of the second object are equal to each other, adding the first object to the column element list.

11. The method for identifying the grid-format object in the RPA environment of claim 7, wherein the comparing of the structure of the first object and the structure of the second object with each other includes:

upon determination that the automation characteristic information of the first object and the automation characteristic information of the second object are not identical with each other, comparing a horizontal width of the first object with a horizontal width of the second object; and upon determination that the horizontal width of the first object and the horizontal width of the second object are not equal to each other, determining a parent object of the search reference object as the first row candidate object.

12. The method for identifying the grid-format object in the RPA environment of claim 1, wherein the identifying of each of the first row candidate object and the second row candidate object as the grid-format object, based on the result of determination on the column relationship includes:

comparing automation characteristic information of a third row candidate object as a sibling object of the determined first row candidate object with automation characteristic information of the first row candidate object;

determining whether the child object of the first row candidate object and a child object of the third row candidate object satisfy a column relationship with each other; and upon determination the automation characteristic information of the third row candidate object and the automation characteristic information of the first row candidate object are identical with each other, and the child object of the first row candidate object and the child object of the third row candidate object satisfy the column relationship with each other, identifying the third row candidate object as the grid-format object.

13. A system for automating work processing by traversing items in a grid-format structure using a robotic process automation (RPA) technology, by identifying a user interface (UI) object displayed on a screen using a non-grid-format UI control in an RPA environment, as a grid-format object, the system comprising:

a communication interface;

a memory configured to load thereon a computer program; and at least one processor configured to execute the computer program, wherein the computer program includes instructions for performing:

an operation of receiving, via a user interface (UI), a search reference object, which is an UI object designated by a user and displayed using a non-grid-format UI control of a target work program, wherein the search reference object is visually expressed as a grid-format UI structure on a screen of the target work program, and the non-grid-format UI control does not provide information about each of rows and each of columns in the grid-format UI structure;

an operation of providing, by an operating system, automation characteristic information including a position, a size, and a control type of the UI object expressed by a node of a hierarchical structure tree;

an operation of searching for an ancestor object of the search reference object on the hierarchical structure tree and determining the searched ancestor object as a first row candidate object using the automation characteristic information provided by the operating system, wherein the determining of the searched ancestor object as the first row candidate object includes;

(i) determining whether an application of the search reference object and an application of a parent object of the search reference object are identical with each other based on whether the search reference object and the parent object are grid-format information displayed on the same UI screen and are objects belonging to the same program; and (ii) upon determination that the application of the search reference object and the application of the parent object of the search reference object are identical with each other, determining the search reference object as the first row candidate object;

an operation of determining a sibling object of the first row candidate object on the hierarchical structure tree as a second row candidate object, by using automation characteristic information of the first row candidate object and automation characteristic information of the sibling object of the first row candidate object, wherein the determining of the sibling object of the first row candidate object as the second row candidate object includes:

(iii) determining whether the automation characteristic information of the sibling object of the first row candidate object and the automation characteristic information of the first row candidate object are identical with each other; and (iv) comparing a structure of a first sibling object having the automation characteristic information identical with the automation characteristic information of the first row candidate object with a structure of the first row candidate object;

an operation of determining whether a child object of the first row candidate object and a child object of the second row candidate object satisfy a column relationship with each other on the hierarchical structure tree;

an operation of identifying each of the first row candidate object and the second row candidate object as a grid-format object, based on a result of determination on the column relationship; and an operation of creating an automation scenario that performs automated work processing by traversing items of the grid-format object, wherein steps (i)-(iv) are recursively performed until a pair of the first row candidate object and the second row candidate object having the same automation characteristic information and the same structure has been detected.

14. The system for identifying the grid-format object in the RPA environment of claim 13, wherein the operation of determining of whether the child object of the first row candidate object and the child object of the second row candidate object satisfy the column relationship with each other includes:

an operation of selecting a second object to be compared with a first object, wherein the first object is the child object of the first row candidate object, wherein the second object is the child object of the second row candidate object;

an operation of comparing automation characteristic information of the first object and automation characteristic information of the second object with each other;

an operation of comparing a structure of the first object and a structure of the second object with each other, based on a result of the comparing between the automation characteristic information of the first and second objects; and an operation of generating a column element list of a row constituting the grid-format object, based on a result of the comparing between the structures of the first and second structures.

15. The system for identifying the grid-format object in the RPA environment of claim 13, wherein the operation of identifying of each of the first row candidate object and the second row candidate object as the grid-format object, based on the result of determination on the column relationship includes:

an operation of comparing automation characteristic information of a third row candidate object as a sibling object of the determined first row candidate object with automation characteristic information of the first row candidate object;

an operation of determining whether the child object of the first row candidate object and a child object of the third row candidate object satisfy a column relationship with each other; and an operation of identifying the third row candidate object as the grid-format object, upon determination the automation characteristic information of the third row candidate object and the automation characteristic information of the first row candidate object are identical with each other, and the child object of the first row candidate object and the child object of the third row candidate object satisfy the column relationship with each other.

16. A non-transitory computer readable medium storing a computer program and connected to a computer device, wherein when the computer program is executed by a computing device, the computer program causes the computer device to perform a method for automating work processing by traversing items in a grid-format structure using a robotic process automation (RPA) technology, by identifying a user interface (UI) object displayed on a screen using a non-grid-format UI control in an RPA environment, as a grid-format object, the method comprising:

an operation of receiving, via a user interface (UI), a search reference object, which is an UI object designated by a user and displayed using a non-grid-format UI control of a target work program, wherein the search reference object is visually expressed as a grid-format UI structure on a screen of the target work program, and the non-grid-format UI control does not provide information about each of rows and each of columns in the grid-format UI structure;

an operation of providing, by an operating system, automation characteristic information including a position, a size, and a control type of the UI object expressed by a node of a hierarchical structure tree;

an operation of searching for an ancestor object of the search reference object on the hierarchical structure tree and determining the searched ancestor object as a first row candidate object using the automation characteristic information provided by the operating system, wherein the determining of the searched ancestor object as the first row candidate object includes:

(i) determining whether an application of the search reference object and an application of a parent object of the search reference object are identical with each other based on whether the search reference object and the parent object are grid-format information displayed on the same UI screen and are objects belonging to the same program; and (ii) upon determination that the application of the search reference object and the application of the parent object of the search reference object are identical with each other, determining the search reference object as the first row candidate object;

an operation of determining a sibling object of the first row candidate object on the hierarchical structure tree as a second row candidate object, by using automation characteristic information of the first row candidate object and automation characteristic information of the sibling object of the first row candidate object, wherein the determining of the sibling object of the first row candidate object as the second row candidate object includes:

(iii) determining whether the automation characteristic information of the sibling object of the first row candidate object and the automation characteristic information of the first row candidate object are identical with each other; and (iv) comparing a structure of a first sibling object having the automation characteristic information identical with the automation characteristic information of the first row candidate object with a structure of the first row candidate object;

an operation of determining whether a child object of the first row candidate object and a child object of the second row candidate object satisfy a column relationship with each other on the hierarchical structure tree;

an operation of identifying each of the first row candidate object and the second row candidate object as a grid-format object, based on a result of determination on the column relationship; and an operation of creating an automation scenario that performs automated work processing by traversing items of the grid-format object, wherein steps (i)-(iv) are recursively performed until a pair of the first row candidate object and the second row candidate object having the same automation characteristic information and the same structure has been detected.

17. The non-transitory computer readable medium of claim 16, wherein the operation of identifying of each of the first row candidate object and the second row candidate object as the grid-format object, based on the result of determination on the column relationship includes:

an operation of comparing automation characteristic information of a third row candidate object as a sibling object of the determined first row candidate object with automation characteristic information of the first row candidate object;

an operation of determining whether the child object of the first row candidate object and a child object of the third row candidate object satisfy a column relationship with each other; and an operation of identifying the third row candidate object as the grid-format object, upon determination the automation characteristic information of the third row candidate object and the automation characteristic information of the first row candidate object are identical with each other, and the child object of the first row candidate object and the child object of the third row candidate object satisfy the column relationship with each other.

* * * * *